(12) United States Patent
Goto

(10) Patent No.: US 9,021,576 B2
(45) Date of Patent: Apr. 28, 2015

(54) APPARATUS AND METHOD FOR SHARING OF AN ENCRYPTION KEY IN AN AD-HOC NETWORK

(75) Inventor: Fumihide Goto, Naka-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 12/667,905

(22) PCT Filed: Aug. 5, 2008

(86) PCT No.: PCT/JP2008/064379
§ 371 (c)(1),
(2), (4) Date: Jan. 6, 2010

(87) PCT Pub. No.: WO2009/022673
PCT Pub. Date: Feb. 19, 2009

(65) Prior Publication Data
US 2010/0332828 A1 Dec. 30, 2010

(30) Foreign Application Priority Data
Aug. 10, 2007 (JP) ................................ 2007-208732

(51) Int. Cl.
G06F 9/00 (2006.01)
H04W 84/18 (2009.01)
H04L 29/06 (2006.01)

(52) U.S. Cl.
CPC ............. *H04W 84/18* (2013.01); *H04L 63/065* (2013.01); *H04L 63/08* (2013.01)

(58) Field of Classification Search
USPC ....................................................... 380/278
See application file for complete search history.

(56) References Cited

U.S. PATENT DOCUMENTS

| 7,013,389 | B1 * | 3/2006 | Srivastava et al. | 713/163 |
| 7,181,614 | B1 * | 2/2007 | Gehrmann et al. | 713/155 |
| 7,263,619 | B1 * | 8/2007 | Kim | 713/194 |
| 7,434,046 | B1 * | 10/2008 | Srivastava | 713/163 |
| 7,489,645 | B2 * | 2/2009 | Simon et al. | 370/254 |
| 7,567,673 | B2 * | 7/2009 | Fukuzawa et al. | 380/270 |
| 7,660,983 | B1 * | 2/2010 | Srivastava et al. | 713/163 |
| 7,665,126 | B2 * | 2/2010 | Simon et al. | 726/6 |
| 7,760,885 | B2 * | 7/2010 | Park | 380/283 |
| 7,793,103 | B2 * | 9/2010 | Fu et al. | 713/171 |

(Continued)

FOREIGN PATENT DOCUMENTS

JP 2006-332895 A 12/2006

OTHER PUBLICATIONS

Changhua He & John C. Mitchell. Analysis of the 802.11i 4-Way Handshake. Oct. 1, 2004. p. 1-8.*

(Continued)

*Primary Examiner* — Christopher Brown
(74) *Attorney, Agent, or Firm* — Fitzpatrick, Cella, Harper & Scinto

(57) ABSTRACT

It is so arranged that an encryption key can be shared with a communication apparatus that participates in a network anew, even in an ad-hoc-mode type of environment. In order to achieve this, a communication apparatus determines whether it possesses an encryption key shared with another communication apparatus and, in accordance with the result of the determination, initiates sharing process for sharing the encryption key with a first communication apparatus from the communication apparatus after the sharing process for sharing the encryption key has been initiated from the first communication apparatus.

8 Claims, 7 Drawing Sheets

(56) References Cited

U.S. PATENT DOCUMENTS

| | | | |
|---|---|---|---|
| 7,869,601 B2* | 1/2011 | Ando et al. | 380/270 |
| 8,068,507 B2* | 11/2011 | Roy | 370/406 |
| 8,122,249 B2* | 2/2012 | Falk et al. | 713/168 |
| 2004/0228492 A1* | 11/2004 | Park | 380/277 |
| 2005/0215234 A1* | 9/2005 | Fukuzawa et al. | 455/411 |
| 2006/0133613 A1* | 6/2006 | Ando et al. | 380/270 |
| 2006/0233377 A1* | 10/2006 | Chang et al. | 380/278 |
| 2007/0214357 A1* | 9/2007 | Baldus et al. | 713/157 |
| 2007/0253376 A1* | 11/2007 | Bonta et al. | 370/338 |
| 2008/0019520 A1* | 1/2008 | Nakahara | 380/247 |
| 2008/0046732 A1* | 2/2008 | Fu et al. | 713/171 |
| 2008/0065884 A1* | 3/2008 | Emeott et al. | 713/168 |
| 2008/0083022 A1* | 4/2008 | Lee et al. | 726/5 |
| 2008/0155645 A1* | 6/2008 | Hutnik et al. | 726/1 |

OTHER PUBLICATIONS

Agre J. et al., "Secure NOmadic Wireless Mesh (SnowMesh) 802.11 TGs ESS Mesh Networking Proposal," IEEE 802.11-05/596r1 (May 2005).

WI-Mesh Alliance, "802.11 TGs MAC Enhancement Proposal," IEEE 802.11-05/575R4, WI-Mesh Alliance Proposal to 802.11 Task Groups (Nov. 2005).

IEEE Computer Society, "802.11i, IEEE Standard for Information Technology—Telcommunications and Information Exchange Between Systems—Local and Metropolitan Area Networks—Specific Requirements; Part 11: Wireless LAN Medium Access Control (MAC) and Physical Layer (PHY) Specifications; Amendment 6: (Medium Access Control (MAC) Security Enhancements" Sponsored by IEEE LAN/MAN Standards Committee (Jul. 2004).

* cited by examiner

APPARATUS AND METHOD FOR SHARING OF AN ENCRYPTION KEY IN AN AD-HOC NETWORK

TECHNICAL FIELD

The present invention relates to a communication apparatus and a communication method therefor.

BACKGROUND ART

Communication data is encrypted in order to prevent bugging and tampering. In particular, since wireless communication is readily susceptible to bugging, assuring a secure communication path is important.

For example, in the infrastructure mode of a wireless LAN, communication terminals and devices at access points implement a standard referred to as WEP (Wired Equivalent Privacy). The WEP standard attempts to assure security by setting an encryption key for a communication terminal and access point in advance and using this encryption key each time communication is performed. With this scheme, however, the encryption key is always fixed and the robustness of the encryption algorithm employed by the WEP standard is not that great. For this reason, various occasions where security cannot be assured have been pointed out.

In order to solve this problem, a standard referred to as WPA (Wi-Fi Protected Access) has been established. The WPA scheme enhances security by improving the robustness of the encryption algorithm and generating an encryption key for every session in which a communication terminal participates in a network.

In the infrastructure mode, a communication terminal transmits data to another communication terminal via an access point. In other words, the communication terminal communicates directly only with the access point. This means that it will suffice if only the security of communication with the access point is assured. In an ad-hoc mode, on the other hand, no access point exists and the communication terminal communicates with the communication terminal of the desired party directly. That is, in order for a terminal to perform encrypted communication with other terminals, it is necessary that the terminal possess the encryption key of every one of the other terminals or that use be made of an encryption key that is common for all communication terminals.

In a case where a terminal possesses the encryption key of every one of other terminals, the more the number of terminals, the more difficult management of the encryption keys becomes.

In a case where use is made of an encryption key that is common on the entire network, the load of key management of every terminal is alleviated.

For example, the specification of Japanese Patent Application Laid-Open No. 2006-332895 describes a method of using an encryption key in the ad-hoc mode.

In the case where the common encryption key is utilized, however, a problem is that it is difficult to assign the same encryption key to a new terminal, namely a terminal that participates in the network anew.

The WPA standard for wireless LANs employs a group key as an encryption key shared by a plurality of terminals. By implementing 4-way handshake (4-Way HS) and group key handshake (GKHS), the group key is sent from the terminal that initiates 4-way handshake to another terminal. In the ad-hoc mode, however, the terminal that initiates 4-way handshake is undetermined.

Further, in the ad-hoc mode, there is no mechanism whereby the terminals that exist on the network are managed centrally. As a result, a terminal already participating in the network does not keep track of terminals that do not possess a group key. Consequently, it is difficult for a terminal already participating in the network to find a terminal that does not possess the group key and to initiate the 4-way handshake.

In addition, when a terminal that participates in the network anew initiates the 4-way handshake, the new terminal distributes the group key and the group key that was being utilized on the network thus far cannot be distributed to new terminals.

The present invention seeks to make it possible to share an encryption key by distributing the encryption key to a communication apparatus that participates in a network anew, even in an ad-hoc-mode type of environment.

DISCLOSURE OF INVENTION

According to one aspect of the present invention, a communication apparatus comprises: sharing means for executing sharing process for sharing an encryption key with a first communication apparatus, wherein an apparatus that initiates the sharing process provides the encryption key in the sharing process; determination means for determining whether the communication apparatus already possesses an encryption key possessed by a second communication apparatus; and control means which, in accordance with result of the determination by the determination means, initiates the sharing process with the first communication apparatus from the communication apparatus after the sharing process for sharing the encryption key has been initiated from the first communication apparatus.

According to another aspect of the present invention, a communication method in a communication apparatus, the method comprises the steps of: accepting encryption-key sharing process from a first communication apparatus, wherein an apparatus that initiates the sharing process provides the encryption key; determining whether the communication apparatus already possesses an encryption key possessed by a second communication apparatus; and initiating the sharing process from the communication apparatus in accordance with result of the determination at the determination.

In accordance with the present invention, it is possible to share an encryption key by distributing the encryption key to a communication apparatus that participates in a network anew, even in an ad-hoc-mode type of environment.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

First Embodiment

A communication apparatus according to the present invention will now be described in detail with reference to the drawings. An example in which a wireless LAN system compliant with the standard of IEEE 802.11 is used will be described. The present invention is applicable to other communication schemes as well.

A hardware configuration in the preferred embodiment will be described.

Figure 1:
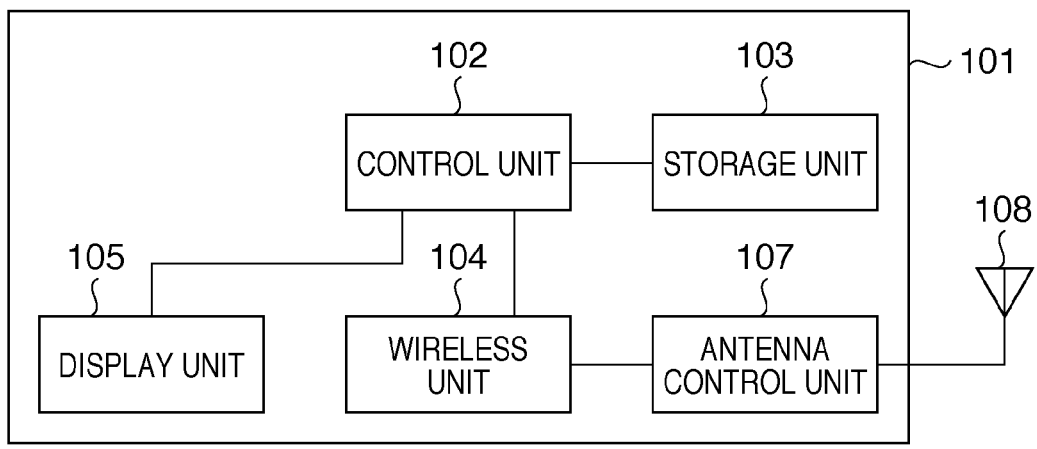
FIG. 1 is a block diagram of a terminal according to a first embodiment of the present invention.

FIG. 1 is a block diagram showing a configuration of each terminal (to be described later) according to embodiments to which the present invention is applicable. The overall communication apparatus is indicated at 101. A control unit 102 controls the overall apparatus by executing a control program stored in a storage unit 103. The control unit 102 also exercises sequence control for exchange of an encryption key with another communication apparatus. The storage unit 103 stores the control program executed by the control unit 102 and various information such as communication parameters. Various operations of an operation flowchart and sequence charge described later are performed by having the control unit 102 execute the control program stored in the storage unit 103. A wireless unit 104 is for performing wireless communication. A display unit 105 presents various displays and has a function for outputting visually perceivable information, as in the manner of an LCD (liquid crystal display) or LED (light-emitting diode), or a function for outputting sound, as in the manner of a speaker. An antenna control unit 107 controls an antenna 108.

Figure 9:
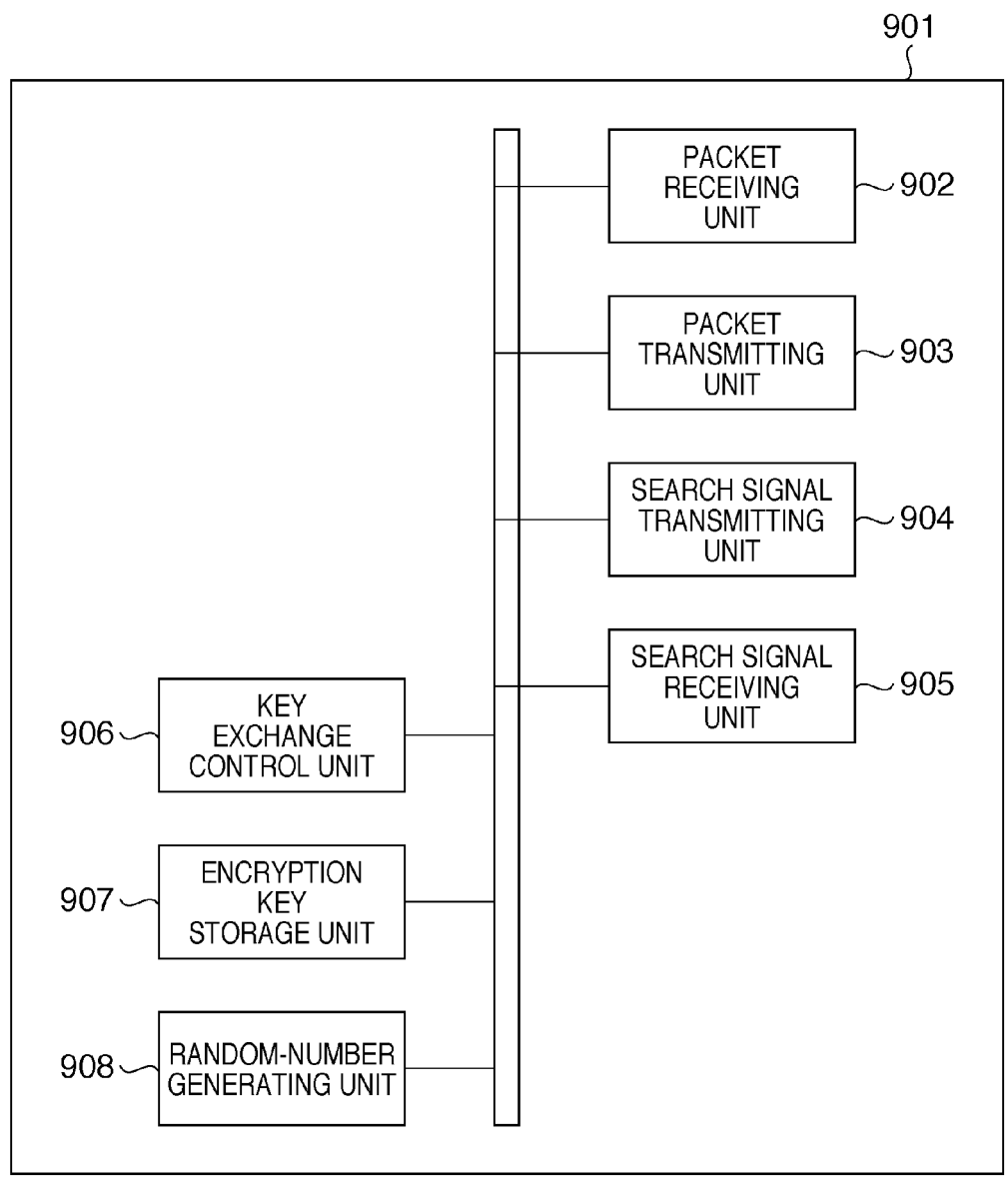
FIG. 9 is functional block diagram of software within a terminal according to the first embodiment of the present invention.

FIG. 9 is block diagram representing an example of software functions blocks executed by the communication apparatus according to this embodiment.

Reference numeral 901 denotes an overall terminal. A packet receiving unit 902 receives packets associated with a variety of communications, and a packet transmitting unit 903 transmits packets associated with a variety of communications. A search signal transmitting unit 904 controls transmission of a device search signal such as a Probe_Request signal. Transmission of the Probe_Request signal, described later, is performed by the search signal transmitting unit 904. Further, transmission of a Probe_Response signal, which is a signal that is in response to the received Probe_Request signal, also is performed by the search signal transmitting unit 904.

A search signal receiving unit 905 controls reception of a device search signal such as a Probe_Request signal from another terminal. Receipt of the Probe_Request signal, described later, is performed by the search signal receiving unit 905. Further, reception of a Probe_Response signal also is performed by the search signal receiving unit 905. It should be noted that various information (self-information) concerning a device that transmits the Probe_Response signal is appended to the Probe_Response signal.

A key exchange control unit 906 administers sequence control in process for exchanging a session key and group key with another communication apparatus. Process of sessions of 4-way handshake and group key handshake in WPA key exchange process exemplified in this embodiment is executed by the key exchange control unit 906.

Here 4-way handshake and group key handshake in WPA (Wi-Fi Protected Access) will be described in simple terms. In this embodiment, 4-way handshake and group key handshake are described as encryption-key exchange process but can also be referred to as sharing process whereby an encryption key is provided from one communication apparatus to another communication apparatus and shared.

The 4-way handshake and group key handshake are executed between an authenticator and a supplicant. In the description that follows, the authenticator is described as the authenticating side and the supplicant as the side to be authenticated.

With 4-way handshake, a shared key (a pre-shared key) is shared beforehand by the authenticator and supplicant, and the pre-shared key is utilized in generating a session key.

First, the authenticator generates a random number (a first random number) and sends the supplicant a message 1 that includes the generated first random number.

Upon receiving message 1, the supplicant generates a random number (second random number) itself. The supplicant generates a session key from the second random number generated by this side itself, the first random number received from the authenticator and the pre-shared key.

The supplicant that has generated the session key sends the authenticator a message 2 that includes the second random number and its own encryption and authentication support information (WPAIE).

Upon receiving message 2, the authenticator generates a session key from the first random number generated by the authenticator itself, the second random number received from the supplicant and the pre-shared key. At this stage the authenticator and supplicant have generated the same session key if the first random number, second random number and pre-shared key are the same.

The authenticator that has generated the session key sends the supplicant a message 3 that includes its own encryption and authentication support information (WPAIE) and a session-key install instruction.

The authenticator and supplicant are capable of installing the session key using the sending and receiving of message 3 as the trigger.

Upon receiving message 3, the supplicant sends the authenticator a message 4 to notify it of the fact that message 3 has been received.

Thus, with 4-way handshake, messages 1 to 4 are sent and received between the authenticator and the supplicant, whereby a session key serving as an encryption key can be exchanged (in actuality, an exchange of random numbers for generating a session key is performed) and shared.

It should be noted that installation of a session key can be performed using the sending and receiving of message 4 as the trigger.

With group key handshake, the authenticator encrypts a group key using a session key exchanged in the 4-way handshake. The authenticator sends the supplicant a message 1 that includes the encrypted group key. The group key is an encryption key for performing group communication. Therefore, if the group key is already being shared with another communication apparatus, then the authenticator transmits this group key. If there is no group key being shared with another communication apparatus, or if a group key being shared with another communication apparatus is not shared with the supplicant, then the authenticator generates a group key and transmits the generated group key to the supplicant.

The supplicant uses the session key to decode the group key included in the received message 1 and sends the authenticator a message 2 to notify it of the fact that message 1 has been received.

Thus, with group handshake, messages 1 and 2 are sent and received between the authenticator and the supplicant, whereby a group key serving as an encryption key for when group communication is carried out can be exchanged.

Thus the authenticator can also be referred to as a "provider", which supplies an encryption key, and the supplicant can also be referred to as a "receiver" (or "acceptor"), which receives the encryption key provided by the authenticator (provider).

It should be noted that since 4-way handshake and group handshake have been standardized in IEEE 802.11i, reference should be had to IEEE 802.11i for the details.

An encryption key storage unit 907 stores session keys and group keys exchanged in the key exchange control unit 906. Whether or not execution of key exchange with another communication apparatus has been completed can be determined by the fact that information has been stored in the encryption key storage unit 907.

A random-number generator 908 generates random-number information for when a session key is generated in the key exchange control unit 906. A random number that has been generated in the random-number generator 908 may also be utilized when a group key is generated.

It should be noted that all of the function blocks are interrelated in terms of software or hardware. Further, the above-mentioned function blocks are examples, and it may be so arranged that a plurality of function blocks construct a single function block, and any function block may be broken down further into blocks that perform a plurality of functions.

Figure 2:
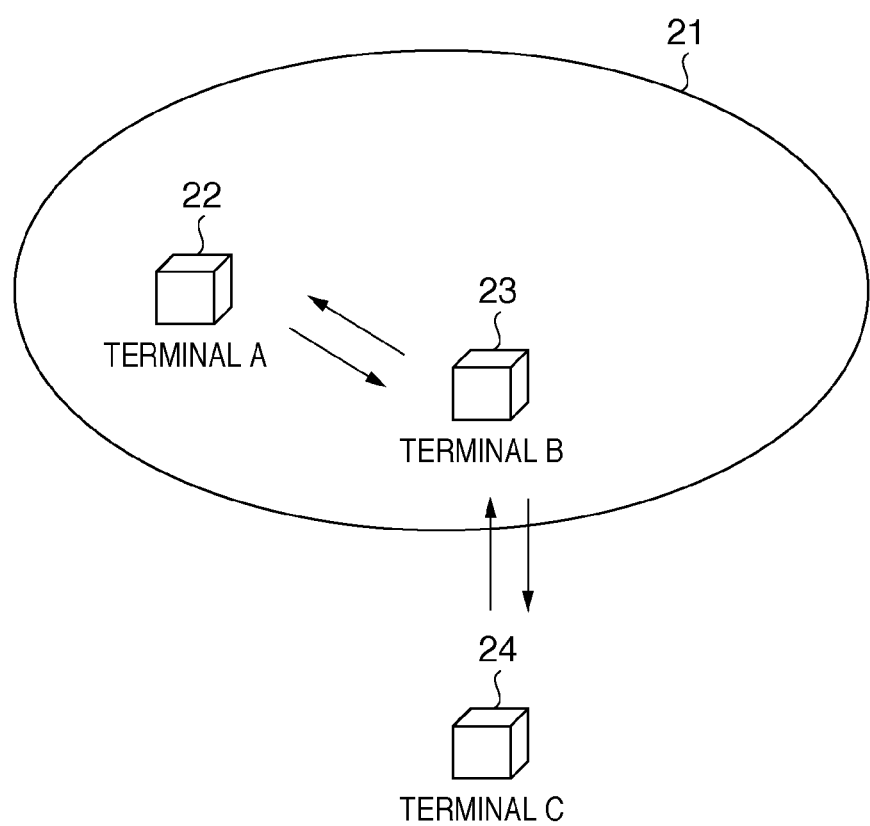
FIG. 2 illustrates a case where an ad-hoc network has been formed by three terminals in the first embodiment of the present invention.

FIG. 2 is a diagram illustrating a terminal A 22, a terminal B 23 and a terminal C 24, as well as an ad-hoc network 21 created by the terminal A 22 and the terminal B 23.

Each terminal is equipped with a wireless LAN communication function compliant with IEEE 802.11, performs wireless communication by wireless LAN ad-hoc communication ("ad-hoc communication" below) and is configured as illustrated in FIGS. 1 and 2 described earlier.

In FIG. 2 it is assumed initially that exchange of an encryption key has been completed between the terminal A 22 (referred to as "terminal A" below) and the terminal B 23 (referred to as "terminal B" below).

Consider a situation in which the network 21 has been set up by an encryption-key exchange and is joined by the terminal C 24 (referred to as "terminal C" below), which is a newly participating communication apparatus.

Figure 5:
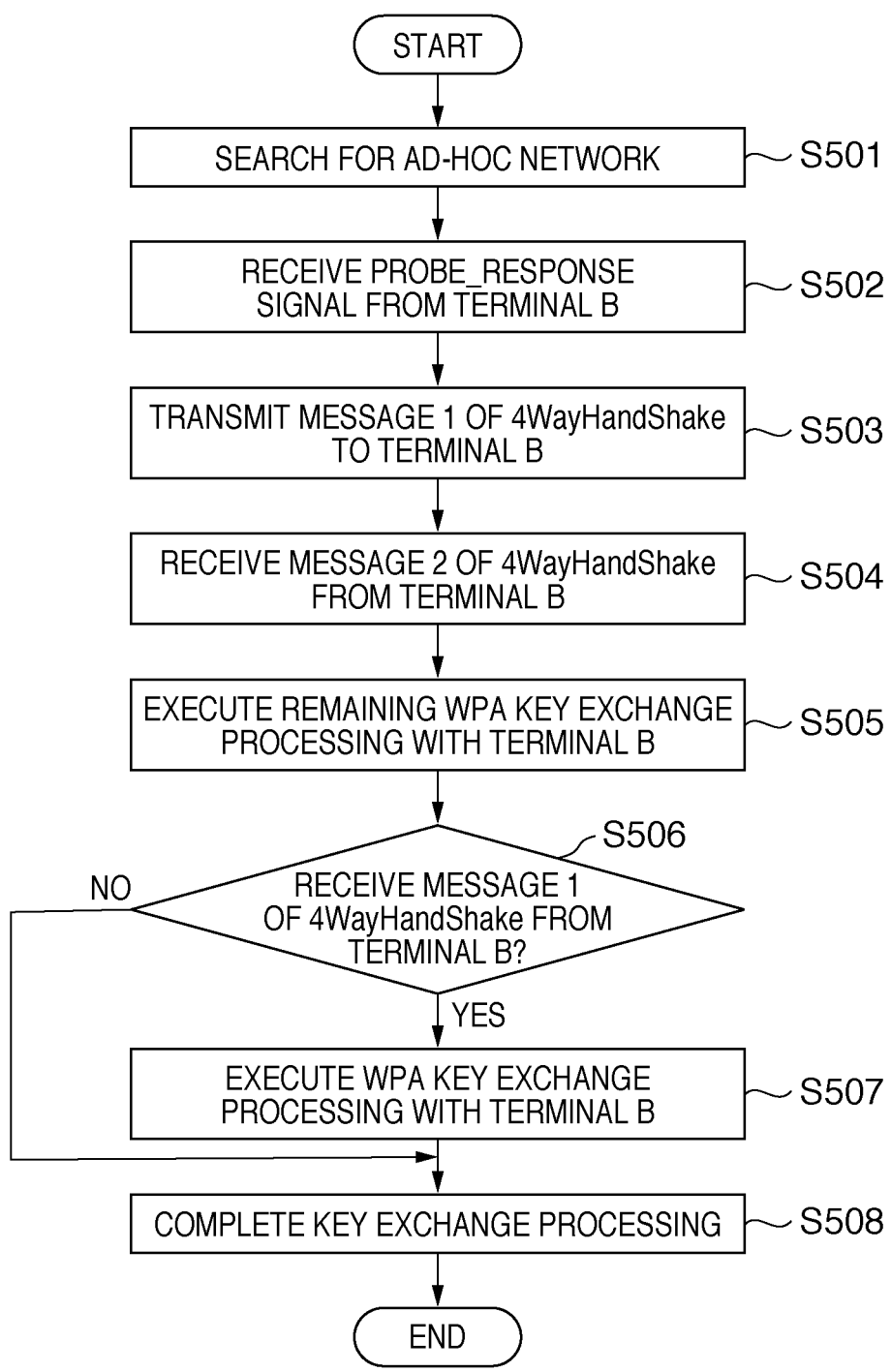
FIG. 5 is a flowchart illustrating operation of terminal C in the first embodiment.

FIG. 5 is an operation flowchart for when terminal C joins the network 21.

Terminal C transmits a Probe_Request signal in order to search for a network to join (S501). If the network 21 exists, terminal A or terminal B sends back a Probe_Response signal (S502). Here it is assumed that a Probe_Response signal has been received from terminal B.

Since a party to communication has thus been specified, terminal C, which is the terminal newly participating in the network, initiates process as an authenticator in the process for key exchange. First, terminal C sends terminal B the message 1 of the WPA 4-way handshake (S503). Terminal C subsequently receives the message 2 of the WPA 4-way handshake from terminal B (S504). Owing to receipt of message 2, an agreement to perform a key exchange has been reached between terminal B and terminal C and the remaining WPA key exchange process is executed (S505).

The remaining WPA key exchange process will now be described. Following step S504, terminal C transmits message 3 of the 4-way handshake to terminal B and, as a response, receives message 4 of the 4-way handshake from terminal B. Owing to the 4-way handshake, session key generation and distribution are performed and the session key is shared between terminal B and terminal C.

Terminal C carries out group handshake upon the conclusion of 4-way handshake. In group handshake, first the terminal C, which is the authenticator, transmits the message 1 of the group handshake. As a response to message 1, terminal C receives message 2 from terminal B. The group key can be shared by such group handshake.

This series of message exchanges in 4-way handshake and group handshake is referred to as WPA key exchange process. Similar terminology will be used below.
Checked to Here By virtue of the WPA key exchange process of steps S503 to S505, a session key is shared between terminals B and C, the group key is protected by encrypting the group key using the session key, and the group key can be sent from terminal C to terminal B securely.

The group key generated by terminal C is shared between terminals B and C by the process thus far. However, in a case where terminal B is already participating in the network 21, the group key just shared and the group key of network 21 will be different and the already existing terminal 21 and terminal C will be incapable of communicating with each other. Accordingly, now terminal B initiates key exchange as the authenticator in order to transmit the group key possessed by the existing network 21 to terminal C.

Since the trigger of the key exchange is message 1 of the 4-way handshake, terminal C determines whether message 1 of the 4-way handshake is received from terminal B (S506). If nothing in particular is received, then key exchange process is completed and process is exited (S508).

If message 1 of the 4-way handshake has been received from terminal B at S506, then WPA key exchange process is executed with terminal B serving as the authenticator, as described earlier (S507). Owing to the WPA key exchange process of step S507, a session key is generated between terminal B and terminal C, protection of the group key is afforded by encrypting the group key by the session key, and the group key can be sent from terminal B to terminal C securely. At this time terminal B sends the group key of network 21 (the group key shared by terminals A and B) to terminal C.

As a result, terminal C is capable of sharing the group key already possessed by terminal B. Here, for the sake of security, terminal B may update the group key possessed thus far. If terminal B updates the group key, then the group key newly generated by terminal B is transmitted to terminal C. Further, terminal B sends the other terminal (terminal A) a group key identical with the group key that has been transmitted to terminal C. As a result, all of the group keys possessed by the terminals that belong to the network 21 are updated. By updating the group key whenever there is an increase in participating terminals, it is possible to create a network that is more robust in terms of encryption than ad-hoc networks based upon WEP or the like heretofore.

Figure 6:
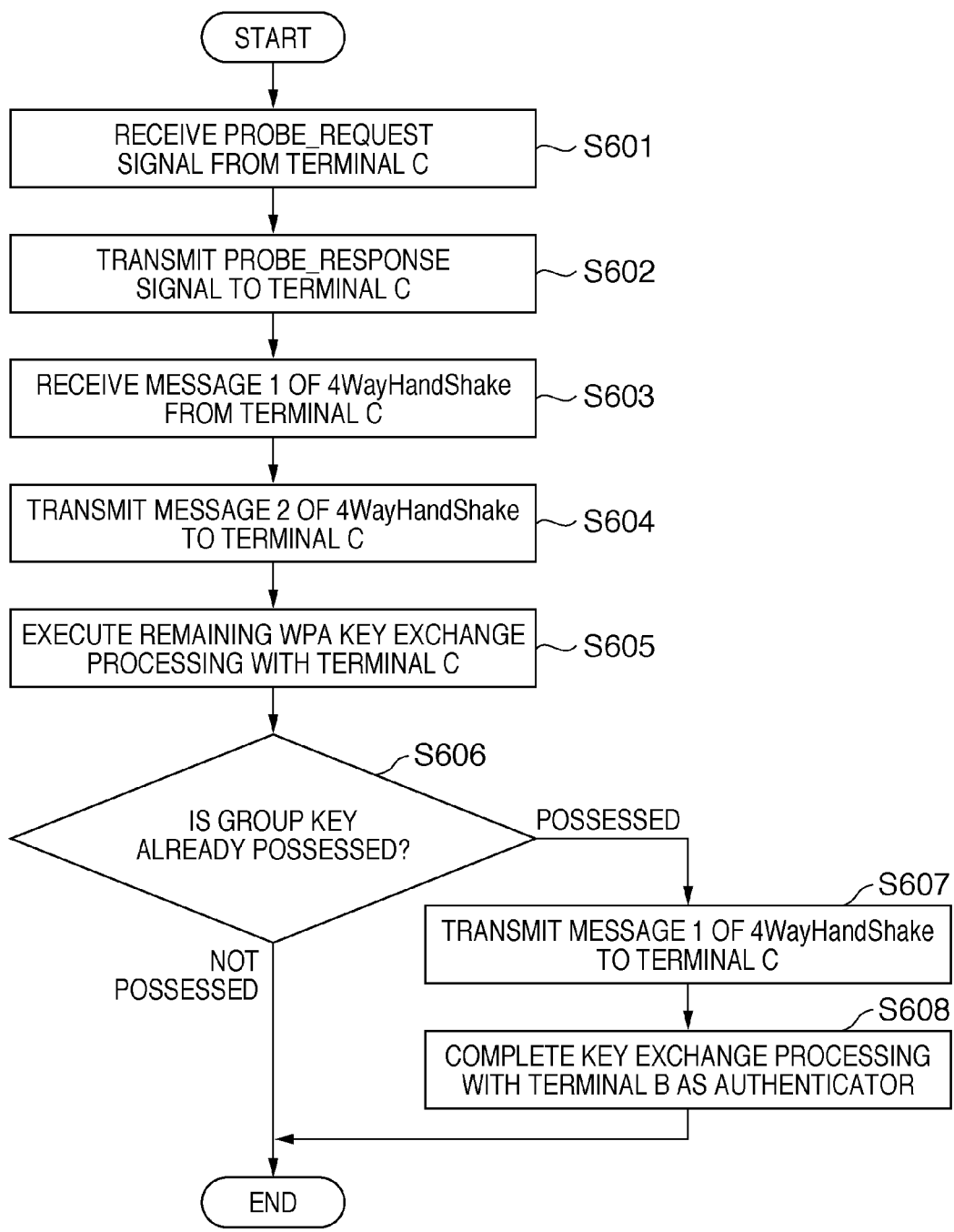
FIG. 6 is a flowchart illustrating operation of terminal B in the first embodiment.

FIG. 6 is a flowchart illustrating operation of terminal B.

Terminal B receives a Probe_Request signal from Terminal C, which is attempting to join the network 21 anew (S601). Terminal B sends a Probe_Response signal back to terminal C as a response (S602).

Since terminal C has recognized the network 21, it sends message 1 of the 4-way handshake. Terminal B, therefore, receives this message (S603).

Upon receiving message 1, terminal B transmits message 2 to terminal C (S604). Owing to the sending and receiving of messages 1 and 2, an agreement to perform key exchange process has been reached between terminal B and terminal C and the remaining WPA key exchange process is executed (S605). Specifically, messages 3 and 4 of the 4-way handshake and messages 1 and 2 of the group handshake are sent and received.

Terminal B receives the group key from terminal C by virtue of this key exchange process. a case where terminal B has already created the network 21, it possesses the group key before a key exchange is performed with terminal C. However, there are also instances where the network 21 has not been created and this time is the first time the key exchange is carried out. Accordingly, terminal B determines whether it itself already possesses the group key (S606). In other words, terminal B determines whether the network 21 has already been created. If the network 21 has already been created, then this means that terminal B itself already has the group key. If the network has not been created, this means that terminal does not possess the group key.

If the result of the determination at step S606 is that terminal B does not possess the group key, then process is exited as is. On the other hand, if the result of the determination at step S606 is that terminal B does possess the group key, then terminal B transmits message 1 of the 4-way handshake to terminal C so that terminal C can communicate within the already existing network 21 (S607). In other words, the role of terminal B switches from that of the supplicant to that of the authenticator and key exchange process starts with terminal B as the authenticator. The sending and receiving of the remaining messages 2 to 4 between terminal B and terminal C and group handshake are carried out and key exchange process with terminal B as the authenticator is completed (S608).

It should be noted that the process for key exchange between terminals B and C at S607 and S608 has already been described in connection with S506 and S507 in FIG. 5 and need not be described again.

Figure 3:
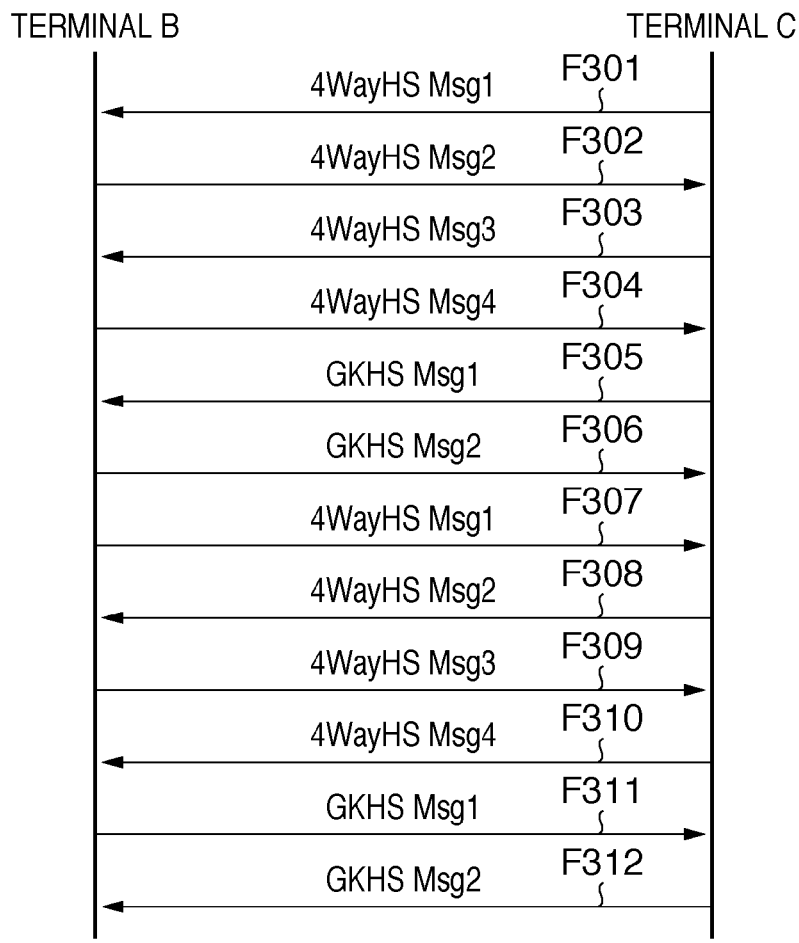
FIG. 3 is a sequence diagram representing the operation of terminals B and C in the first embodiment.

FIG. 3 is a sequence diagram for when terminal C joins the network 21. The operation algorithms of terminals B and C are as illustrated in FIGS. 6 and 5, respectively, described above.

Terminal C, which is the newly participating terminal, transmits message 1 of the 4-way handshake to terminal B constituting the network 21 (F301). Terminal B responds by transmitting message 2 of the 4-way handshake (F302). Message 3 (F303) and message 4 (F304) of the 4-way handshake are then exchanged. At the end of the 4-way handshake, an exchange of message 1 (F305) and message 2 (F306) of the group handshake is carried out. As a result, terminal C shares a group key with terminal B.

However, terminal B has already created the network 21 with terminal A, as illustrated in FIG. 2. Accordingly, in order for the terminals of the network 21 to communicate with each other, the group key of terminal C must be made to agree with that of terminals A and B. Accordingly, the roles of terminals B and C are changed over and message 1 of the 4-way handshake is now transmitted from terminal B to terminal C (F307). This is followed by reversing the roles of terminal B and C with regard to the operations F301 to F306 to thereby carry out 4-way handshake and group handshake (F307 to F312).

As a result, the group key possessed by terminal B is applied to terminal C and terminals A, B and C can share the same group key.

Second Embodiment

An example of the hardware configuration in a second embodiment is similar to that of the first embodiment as shown in FIG. 1, and the configuration of the software blocks is assumed to be that shown in FIG. 9. Further, an example of the network configuration in the second embodiment also similar to that of the first embodiment as shown in FIG. 2.

Figure 7:
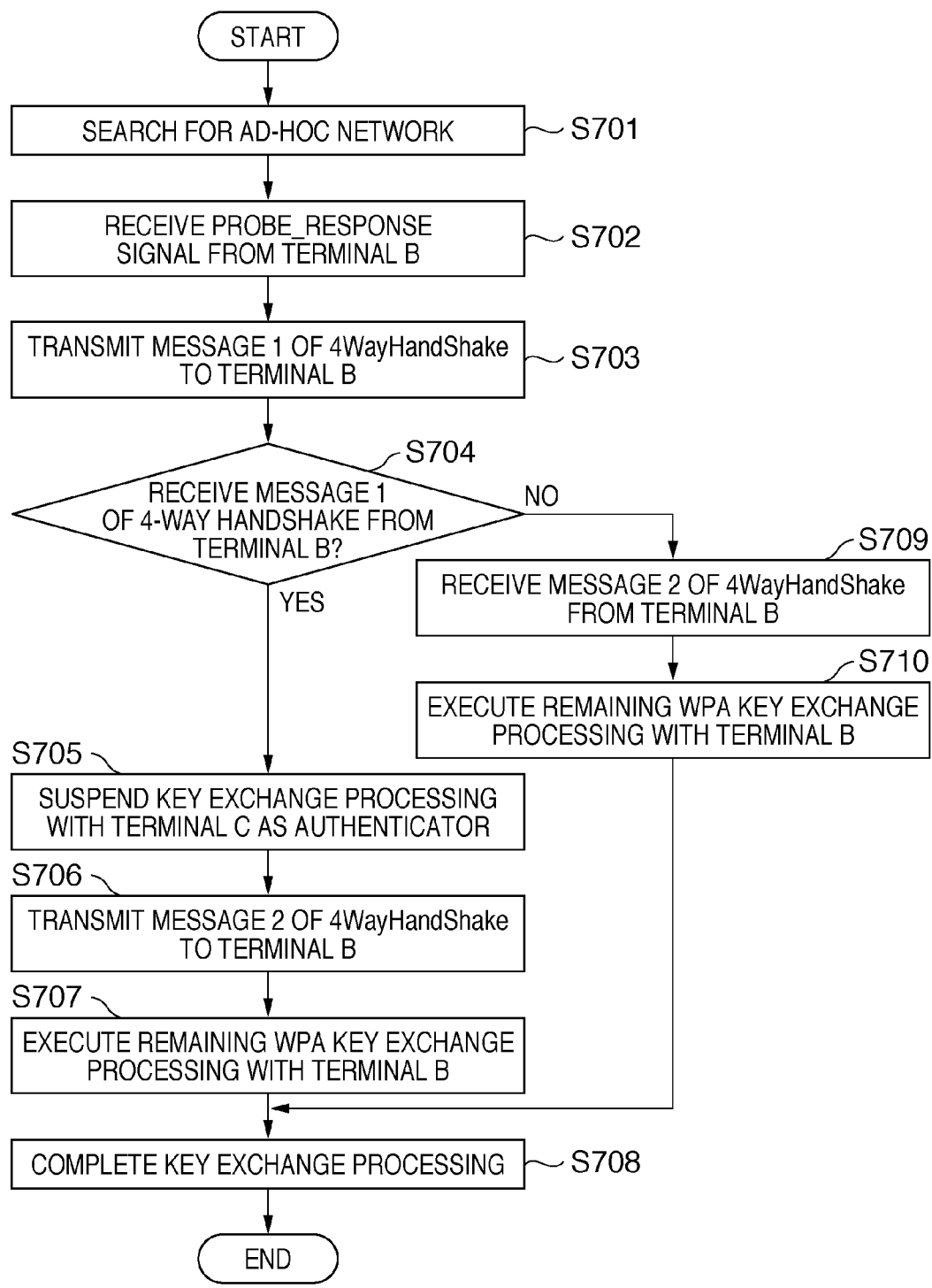
FIG. 7 is a flowchart illustrating operation of terminal C in the second embodiment.

FIG. 7 is a flowchart illustrating operation of terminal C according to this embodiment.

Terminal C transmits a Probe_Request signal in order to search for a network to join (S701). If the network 21 exists, terminal A or terminal B sends back a Probe_Response signal (S702). Here it is assumed that a Probe_Response signal has been received from terminal B.

Since a party to communication has thus been specified, terminal C, which is the terminal newly participating in the network, initiates process as an authenticator in the process for key exchange. First, terminal C sends terminal B the message 1 of the WPA 4-way handshake (S703).

If terminal B is already participating in the network 21, terminal C becomes the authenticator and, when it transmits a group key to terminal B, terminal C cannot communicate with the terminals of the network 21. If it so happens that a group key that has been generated by terminal C is coincidentally the same as that of network 21, then terminal C would be capable of communicating with the terminals of network 21 but the possibility of this happening is extremely small. Accordingly, in a case where terminal B has the group key possessed by the already existing network 21, it initiates key exchange as the authenticator in order to transmit this key to terminal C.

When terminal C transmits message 1 of the WPA 4-way handshake to terminal B, it determines whether message 1 of the 4-way handshake is received from terminal. B (S704).

If nothing in particular is received, then message 2 of the 4-way handshake is received from terminal B (S709). The remaining key exchange process is then carried out (S710) and key exchange process is terminated (S708).

More specifically, with terminal C remaining as the authenticator, it performs 4-way handshake and group handshake, transmits the group key of terminal C to terminal B and shares the group key of terminal C.

On the other hand, if it is determined at step S704 that message 1 of the 4-way handshake has been received from terminal B, then terminal C suspends key exchange process as the authenticator. In this case, terminal B starts key exchange process as the authenticator and terminal C transmits message 2 of the 4-way handshake to terminal B (S706). Since 4-way handshake with terminal B has started, terminal C executes the remaining WPA key exchange process (S707). By virtue of the WPA key exchange process at step S707, a session key is shared between terminals B and C. The group key is protected by this session key and the group key is sent from terminal B to terminal C securely. At this time terminal B sends the group key of the network 21 (this group key is common to both terminals A and B) to terminal C. As a result, terminal C can share the group key possessed by terminal B. For the sake of security, terminal B can update the group key possessed thus far. In a case where terminal B updates the group key, a group key generated anew by terminal B is transmitted to terminal C. Further, terminal B also sends other terminals (terminal A) a group key the same as the group key that was transmitted to terminal C. As a result, all of the group keys possessed by the terminals that belong to the network 21 are updated. By updating the group key whenever there is an increase in participating terminals, it is possible to crate a network that is more robust in terms of encryption than ad-hoc networks based upon WEP or the like heretofore.

Figure 8:
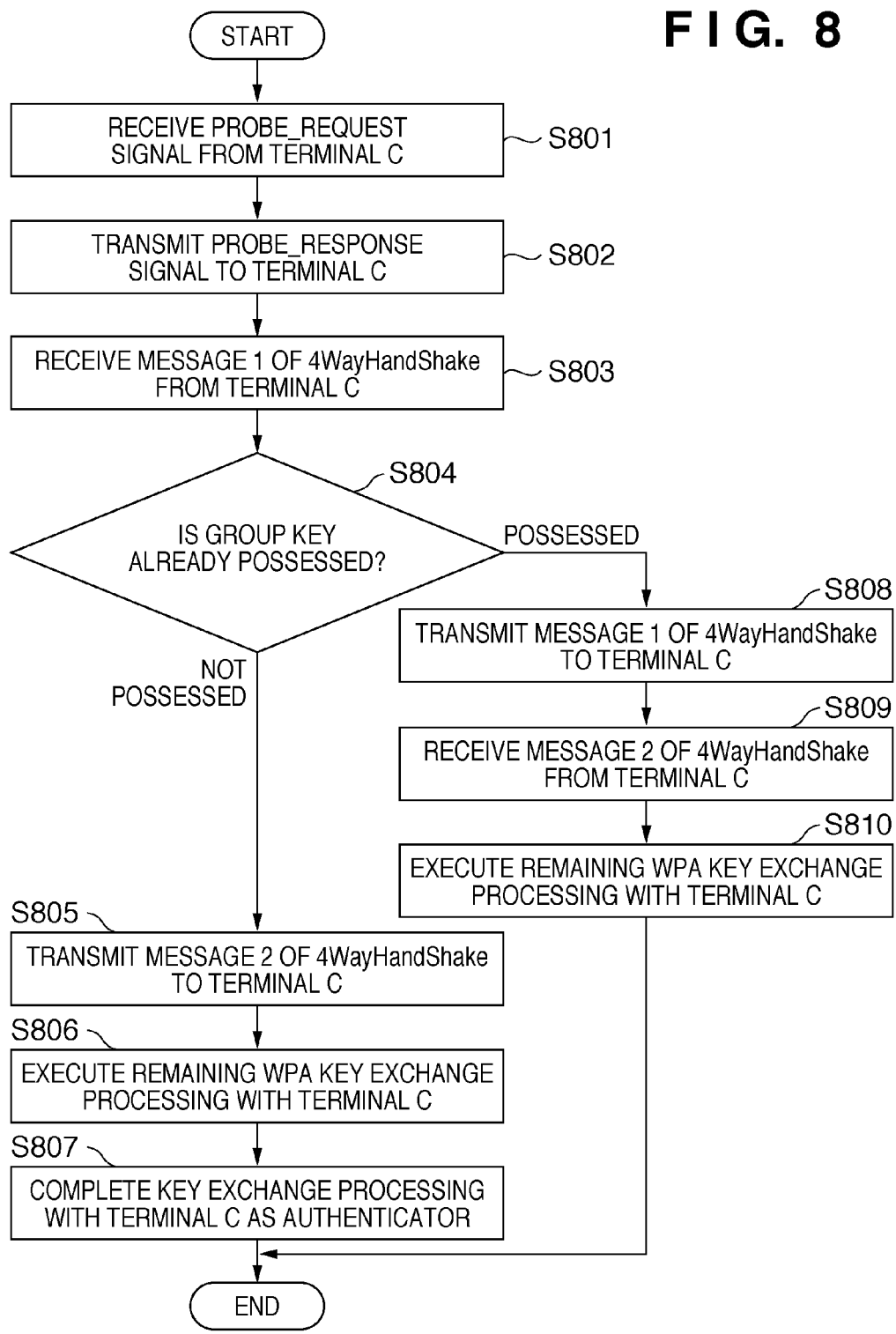
FIG. 8 is a flowchart illustrating operation of terminal B in the second embodiment.

FIG. 8 is a flowchart illustrating operation of terminal B.

Terminal B receives a Probe_Request signal from Terminal C, which is attempting to join the network 21 anew (S801). Terminal B sends a Probe_Response signal back to terminal C as a response (S802).

Since terminal C has recognized the network 21, it sends message 1 of the 4-way handshake. Terminal B, therefore, receives this message (S803).

If 4-way handshake and group handshake continue as is, terminal B will receive the group key from terminal C. However, in a case where terminal B has already crated the network 21, terminal B possesses the group key of terminal 21 (the group key common with that of terminal A) before it executes key exchange with terminal C. However, there are also instances where a network has not been created and this time is the first time the key exchange is carried out. Accordingly, terminal B determines whether it itself already possesses the group key (S804). In other words, terminal B determines whether the network 21 has already been created. If the network 21 has already been created, then this means that terminal B itself already has the group key. If the network has not been created, this means that terminal B does not possess the group key.

If the result of the determination at step S804 is that terminal B does not possess the group key, then process continues as is. That is, message 2 of the 4-way handshake is transmitted to terminal C (S805). The remaining WPA key exchange process with terminal C is then executed (S806) and key exchange process with terminal C as the authenticator is completed (S807).

On the other hand, if the result of the determination at step S804 is that terminal B does possess the group key, then terminal B transmits message 1 of the 4-way handshake to terminal C so that terminal C can communicate with the already existing network 21 (S808). In other words, although terminal C initiated key exchange process as the authenticator, message 1 is transmitted from terminal B to terminal C in order to suspend this process, change over terminal B to the authenticator and initiate key exchange process.

Thereafter, message 2 of the WPA 4-way handshake from terminal C is received (S809). Owing to receipt of message 2, an agreement to perform a key exchange has been reached between terminal B and terminal C and the remaining WPA key exchange process is executed (S810).

Figure 4:
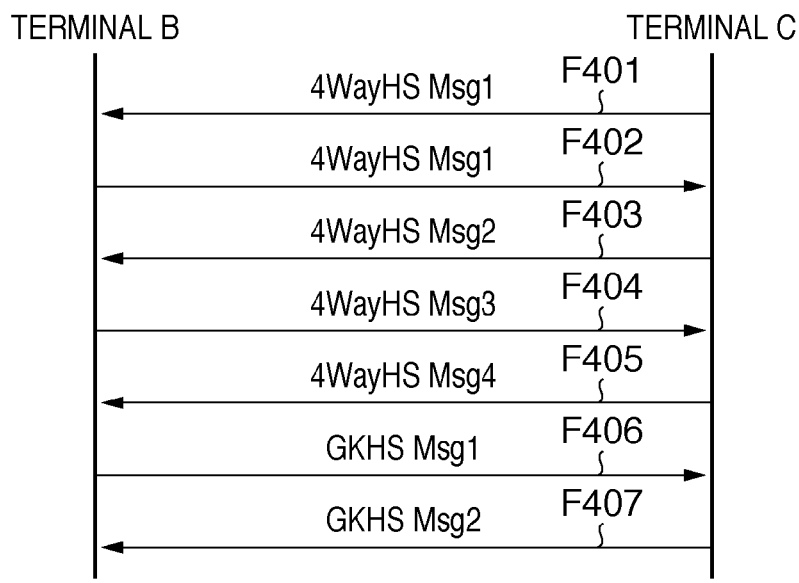
FIG. 4 is a sequence diagram representing the operation of terminals B and C in a second embodiment of the present invention.

FIG. 4 is a sequence diagram for when terminal C joins the network 21. The operation algorithms of terminals B and C are as illustrated in FIGS. 8 and 7, respectively, described above.

Terminal C, which is the newly participating terminal, transmits message 1 of the 4-way handshake to terminal B constituting the network 21 (F401).

Terminal B has already created the network 21 with terminal A as illustrated in FIG. 2. Accordingly, in order for the terminals of the network 21 to communicate with each other, the group key of terminal C must be made to agree with that of terminals A and B.

Accordingly, message 1 of the 4-way handshake is now transmitted from terminal B to terminal C (F402). The roles are reversed and the 4-way handshake and group handshake are carried out (F402 to F407).

As a result, the group key possessed by terminal B is applied to terminal C and terminals A, B and C can share the same group key.

In accordance with the description rendered above, a communication apparatus determines whether it possesses an encryption key shared with a second communication apparatus. In accordance with the result of the determination, after sharing process for sharing the encryption key has started from a first communication apparatus, sharing process with the first communication apparatus starts from the communication apparatus itself.

As a result, an encryption key can be shared with a communication apparatus that participates in a network anew, even in an ad-hoc-mode type of environment.

Further, when a group key is shared with a new communication apparatus, the group key can be updated. Adopting this arrangement provides a higher level of security. In other words, a different encryption key can be utilized whenever a communication session is established and greater robustness is provided with respect to behavior such as interception and bugging.

Although the preferred embodiments of the present invention have been described above, they are merely examples for explaining the present invention, and are not intended to limit the scope of the present invention. Various modifications can be made to the embodiments without departing from the spirit and scope of the present invention.

For example, a key exchange message stipulated by WPA is used in the description of the foregoing embodiments. However, the method of key exchange is not limited; as long as a similar role is performed, any key exchange method may be used.

Further, an IEEE802.11 wireless LAN has been explained as an example. The present invention may, however, be implemented in another wireless medium such as wireless USB, MBOA, Bluetooth (registered trademark), UWB (Ultra Wide Band), or ZigBee. The present invention may also be implemented in a wired communication medium such as a wired LAN.

Here MBOA is an abbreviation for Multi Band OFDM Alliance. In addition, UWB includes wireless USB, wireless 1394 and WINET.

In the present invention, a recording medium which stores software program codes for implementing the above-described functions may be supplied to a system or apparatus, and the computer (or the CPU or MPU) of the system or apparatus may read out and execute the program codes stored in the storage medium. In this case, the program codes read out from the recording medium implement the functions of the above-described embodiments, and the recording medium which stores the program codes constitutes the present invention.

The recording medium for supplying the program codes includes a flexible disk, hard disk, optical disk, magneto-optical disk, CD-ROM, CD-R, magnetic tape, nonvolatile memory card, ROM, and DVD.

The above-described functions are implemented when the computer executes the readout program codes. Also, the above-described functions may be implemented when an operating system running on the computer performs some or all of actual processes on the basis of the instructions of the program codes.

Furthermore, the above-described functions may be implemented when the program codes read out from the storage medium are written in the memory of a function expansion board inserted into the computer or the memory of a function expansion unit connected to the computer, and the CPU of the function expansion board or function expansion unit performs some or all of actual processes on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-208732, filed Aug. 10, 2007, which is hereby incorporated by reference herein in its entirety.

The invention claimed is:

1. A communication apparatus, comprising:
a receiver adapted to receive, from another communication apparatus, a first signal indicating that a first sharing process for sharing a first encryption key has been initiated by the other communication apparatus; and
a transmitter adapted to suspend, when the first signal has been received by the receiver, the first sharing process initiated by the other communication apparatus and to transmit, to at least the other communication apparatus, a second signal indicating that a second sharing process for sharing a second encryption key has been initiated by the communication apparatus,
wherein the first and second signals are each a message 1 signal defined in a 4-way handshake protocol.

2. The communication apparatus according to claim 1, further comprising a determination unit configured to determine whether a network with the other communication apparatus has been created.

3. The communication apparatus according to claim 1, further comprising a determination unit configured to determine whether the communication apparatus possesses a group encryption key shared with the other communication apparatus,
wherein the transmitter suspends the first sharing process initiated by the other communication apparatus and transmits the second signal, when the determination unit determines that the communication apparatus possesses the group encryption key.

4. The communication apparatus according to claim 1, wherein the 4-way handshake protocol is a protocol complying with a Wi-Fi Protected Access (WPA) standard.

5. The communication apparatus according to claim 1, wherein the transmitter does not transmit a message 2 signal defined in the 4-way handshake protocol to the other communication apparatus and transmits the message 1 signal defined in the 4-way handshake protocol to the other communication apparatus, when the message 1 signal defined in the 4-way handshake protocol has been received from the other communication apparatus by the receiver.

6. The communication apparatus according to claim 1, wherein the second encryption key is a group encryption key shared with a plurality of other communication apparatuses, including the other communication apparatus.

7. A communication method in a communication apparatus, the method comprising:
receiving, from another communication apparatus, a first signal indicating that a first sharing process for sharing a first encryption key has been initiated by the other communication apparatus; and
suspending, when the first signal has been received by the receiver, the first sharing process initiated by the other communication apparatus and transmitting, to at least the other communication apparatus, a second signal indicating that a second sharing process for sharing a second encryption key has been initiated by the communication apparatus,
wherein the first and second signals are each a message 1 signal defined in a 4-way handshake protocol.

8. A non-transitory computer-readable storage medium having stored thereon, a program for causing a communication apparatus to perform a communication method, the communication method comprising:
receiving, from another communication apparatus, a first signal indicating that a first sharing process for sharing a first encryption key has been initiated by the other communication apparatus; and
suspending, when the first signal has been received by the receiver, the first sharing process initiated by the other communication apparatus and transmitting, to at least the other communication apparatus, a second signal indicating that a second sharing process for sharing a second encryption key has been initiated by the communication apparatus,
wherein the first and second signals are each a message 1 signal defined in a 4-way handshake protocol.

* * * * *